United States Patent [19]

Buehler et al.

[11] Patent Number: 4,772,050
[45] Date of Patent: Sep. 20, 1988

[54] QUICK-DISCONNECT INFLATABLE SEAL ASSEMBLY

[75] Inventors: Kurt D. Buehler, Titusville, Fla.; James E. Fesmire, Auburn, Ala.

[73] Assignee: The United States of America as represented by the Administrator of the National Aeronautics and Space Administration, Washington, D.C.

[21] Appl. No.: 52,940

[22] Filed: May 22, 1987

[51] Int. Cl.⁴ .............................................. F16L 17/02
[52] U.S. Cl. ........................................ 285/39; 285/97; 285/107; 285/108; 285/109; 285/133.1; 285/351; 285/421; 285/904; 277/34
[58] Field of Search ................. 285/97, 351, 107, 904, 285/109, 421, 108, 39, 133.1; 277/34, 34.3, 34.6; 138/93; 166/187

[56] References Cited

U.S. PATENT DOCUMENTS

| Re. 31,933 | 7/1985 | Taylor et al. | 166/120 |
|---|---|---|---|
| 1,549,168 | 8/1925 | Townsend | 277/34 X |
| 2,835,329 | 5/1958 | True | 166/187 |
| 3,190,679 | 5/1963 | Lester | 285/3 |
| 3,233,315 | 2/1966 | Levake | 285/97 X |
| 3,542,127 | 11/1970 | Malone | 166/122 |
| 3,604,732 | 9/1971 | Malone | 285/106 |
| 3,695,637 | 10/1972 | Satterthwaite et al. | 285/97 |
| 3,810,665 | 5/1974 | Rodgers | 285/97 |
| 3,988,029 | 10/1976 | Gibson | 285/904 |
| 4,216,981 | 8/1980 | Jensen | 285/97 |
| 4,418,918 | 12/1983 | Nicoll | 277/1 |
| 4,467,701 | 8/1984 | Sigmon | 92/103 |
| 4,630,648 | 12/1986 | McCord | 285/97 X |

FOREIGN PATENT DOCUMENTS 990622  4/1965  United Kingdom ................. 277/34

OTHER PUBLICATIONS

Plastics Reference Issue, vol. 40, No. 29, Machine Design Magazine, (Dec. 12, 1968), pp. 53–58.

Primary Examiner—Dave W. Arola
Attorney, Agent, or Firm—James O. Harrell; John R. Manning

[57] ABSTRACT

A zero-leak cryogenic coupling includes a polymeric seal clamped to a male bayonet member with two pairs of tightening rings. The tightening rings threadably engage each other in respective pairs around tapered ends of the inflatable seal member so that a wedging action tightens the seal member about the male bayonet. Once in place, the seal may be inflated via an inflation port so that its expansion provides a pressure contact with the inside surface of a coaxial female member.

17 Claims, 3 Drawing Sheets

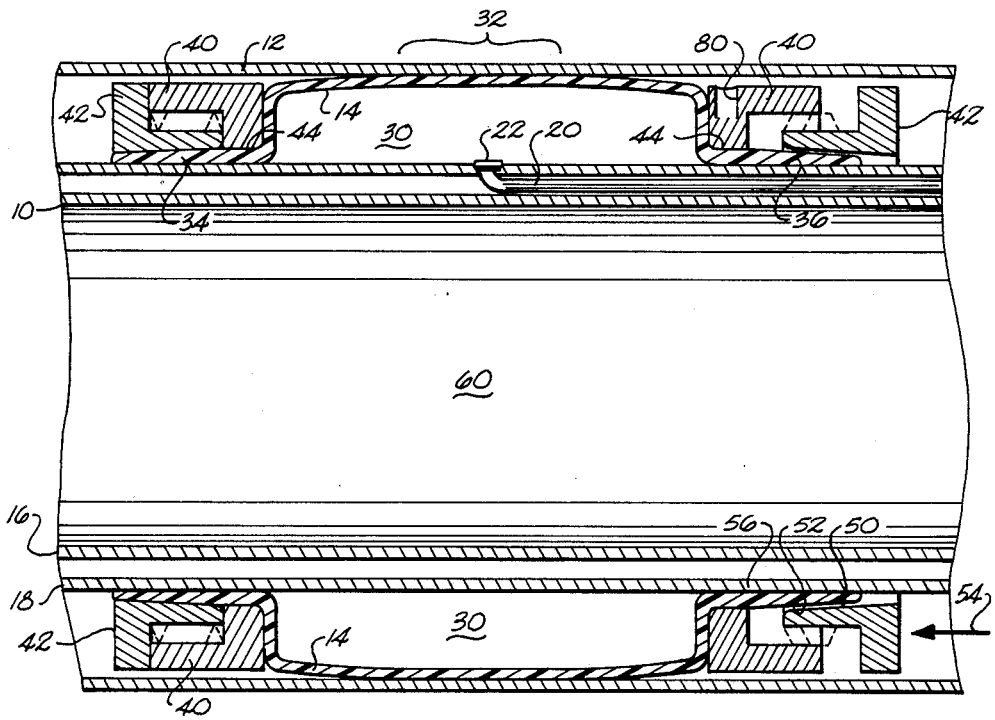
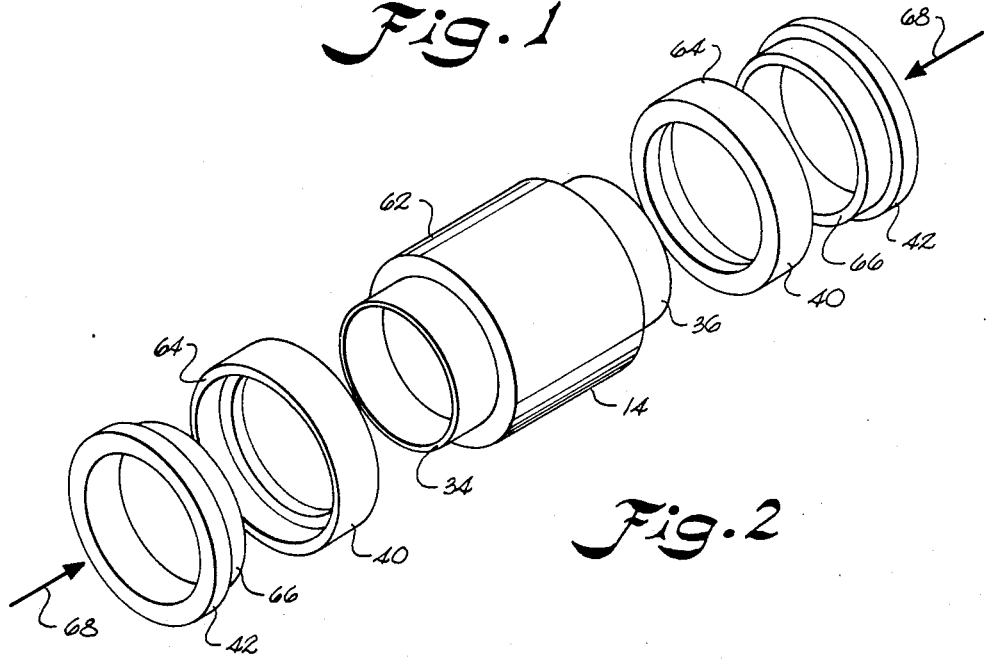
Fig. 1
Fig. 2

4,772,050

QUICK-DISCONNECT INFLATABLE SEAL ASSEMBLY

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention in general concerns an inflatable seal assembly, and more particularly an inflatable seal assembly adapted for use with a bayonet quick-disconnect system, particularly useful for the insulated transfer of cryogenic consumables in orbit (such as between a space station and a re-supply vehicle).

Previously, inflatable seals have been provided about a bayonet member having a quick-disconnect design. One known design includes an inflatable seal having flat annular edges and received around the bayonet member, with such edges each receiving a set of three rings. The inner and outer rings of a given set threadably engage one another, with an intermediate ring captured therebetween. Such intermediate ring is substantially annular, and further includes a plurality of slots therearound. Such slots become compressed as the other two rings of the set are progressively engaged. Such compression is intended to seal the inflatable member with respect to the bayonet member so that controlled inflation thereof may be accomplished.

While generally useful, such three ring tightening assembly has some notable drawbacks in that the various parts thereof are relatively difficult to fabricate, and are not easily assembled in the required orientation for sealing the inflatable member about the bayonet member. Furthermore, minimal sealing area between such members is provided by the overall structure, thereby making even more critical the relative manufacturing tolerances and orientation of the respective elements.

SUMMARY OF THE PRESENT INVENTION

The present invention recognizes and addresses such drawbacks of the prior art, as well as others.

Accordingly, it is one object of the present invention to provide an improved seal assembly, and more particularly to provide an improved inflatable seal assembly for a bayonet quick-disconnect type coupling which is adapted for the transfer of cryogenic materials.

It is also an object of the present invention to provide such an apparatus or device which further is comprised of individual elements which are both easy to manufacture or fabricate, and are particularly easy to reliably assemble in the requisite sealing relationship.

It is yet a further object of the present invention to provide such an apparatus which ensures an adequate sealing area so that an inflatable seal member is adequately sealed about a bayonet quick-disconnect type member, and controllably sealable with respect to a female member receiving such bayonet member.

It is still another object of the present invention to provide such an apparatus which is particularly adapted for the insulated transfer of cryogenic fluids, so as to have particular application for zero-leakage transfer of cryogenic consumables in a zero-gravity environment, such as space. Such apparatus is particularly useful for the transfer of cryogenic consumables between two orbital vehicles, such as from a re-supply ship to a consuming vehicle (such as a space station). In addition, such apparatus performs equally well in non-zero gravity situations, such as ground support tasks for loading cryogenic consumables or other types of fluids into a launch vehicle such as a space shuttle or rocket system therefor.

In accordance with the present invention, the sets of three rings discussed above as fitted about annular ends of an inflatable seal member are replaced with respective sets of two rings each. As a result, not only is there an immediately recognizable advantage from the absolute reduction in the number of elements or members which must be fabricated, but the resulting members in accordance with this invention are also more easily and reliably assembled into the desired relationship.

Furthermore, the seal formed between the inflatable seal member and the bayonet member about which it resides is generally improved with practice of the present invention. For example, an inflatable seal member in accordance with the present invention may have tapered ends at each axial end thereof, with such tapers defining a wedged axial end which diminishes towards such end. Ring members as in accordance with the present invention may then be engaged with one another about such tapered ends in such disposition that some of such rings are drawn inward against the tapered ends of the seal member, thereby tightening such inflatable seal member about the bayonet member.

While various combinations of presently disclosed features may be collected in accordance with the present invention for forming exemplary embodiments thereof, several specific exemplary embodiments are set forth throughout the present application. One exemplary embodiment in accordance with the present invention concerns a seal assembly, comprising: a first tube having an opening in at least one axial end thereof, and defining an interior channel axial therein and intersecting with such opening, the first tube adapted for being received within a second tube of larger diameter; an inflatable seal member received about the first tube and having tapered ends; and securement means, received about the tapered ends, for securing the seal member to the first tube; wherein the inflatable seal member may be controllably inflated when the first tube is received within a second tube so that the seal member is pressed into contact with the inside surface of the second tube, whereby the first tube is sealed with respect to the second tube so as to permit fluid to be passed to the second tube through the channel and the opening of the first tube.

Another quick-disconnect inflatable seal assembly for the leak-proof transfer of fluids in accordance with the present invention comprises: an inner tube having a passage therein adapted for the passage of fluids therethrough; an inflatable seal member, received about the inner tube, and having tapered edges on each axial end thereof; clamping rings received about the tapered edges adequate to secure the seal member about the inner tube; and an outer tube, having an inside diameter larger than the outside diameter of the inner tube with the seal member and the clamping rings disposed thereabout; wherein with the inner tube received within the outer tube, the seal member may be inflated to project radially outward an amount adequate to sealingly contact the outer tube inside diameter, so as to permit the leak-proof transfer of fluids between the tubes.

Still another bayonet-type quick-disconnect cryogenic coupling in accordance with the present invention comprises: a male bayonet member adapted for receipt in a female receptacle member, and for the passage of cryogenic fluid therethrough into the female member; at least one inflatable seal received about the circumference of the bayonet member in a fixed axial portion thereof, the seal member having axial ends including tapered portions inclined away from the body of the seal member; a pair of interacting tightening rings disposed about each axial end of the seal for securing same to the bayonet member; a female member adapted for receipt of the bayonet member therein with the seal and the pairs of rings disposed about the bayonet member; and means for selectively inflating the seal with a gas, while the bayonet member is received in the female member, adequate to sealingly engage the interior of the female member, whereby cryogenic fluids may be passed from the bayonet member to the female member without leakage therebetween.

Various modifications and variations to different features and aspects of the present invention may be envisioned by those of ordinary skill in the art, and are intended to come within the scope and spirit of the present invention by present reference thereto.

BRIEF DESCRIPTION OF THE DRAWINGS

The foregoing objects and features of the present invention, as well as other such objects and features, may be better understood upon considering the present specification in conjunction with the appended drawings, in which:

FIG. 1 illustrates an axial cross-sectional view of a cryogenic coupling constructed in accordance with the present invention;

FIG. 2 illustrates an exploded perspective view of an inflatable seal member having tapered axial ends in accordance with the present invention, and paired ring member for receipt thereon, in accordance with this invention;

Like use of same reference characters in the present specification and drawings is intended to indicate the same or analogous features or aspects of the present invention.

DETAILED DESCRIPTION OF THE PREFERRED EMBODIMENT

Figure 3:
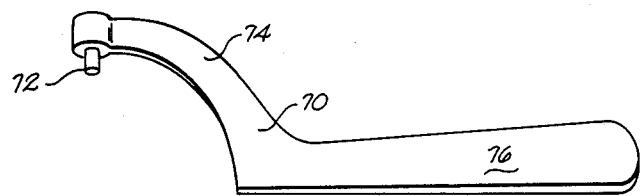
FIG. 3 illustrates a spanner wrench which may be used as described herein for assembling various elements provided in accordance with the present invention.

One general purpose of the present invention is the tightening of an inflatable seal on a bayonet-type cryogenic quick-disconnect coupling. A quick-disconnect (QD) coupling includes a male bayonet member 10 which is slidably received in a female member 12, as shown in FIG. 1. An inflatable seal 14 in accordance with the present invention surrounds male bayonet member 10, and when pressurized, projects radially outward to form a seal with female member 12.

As shown in FIG. 1, bayonet member 10 includes a co-axial double wall construction 16 and 18, and is thus particularly adapted for use with transferring cryogenic fluids because of the resulting insulating properties thereof. Additionally, the radial separation between such walls 16 and 18 is adequate for receipt of an inflation tube 20, which interconnects with an inflation port 22 which is formed on an exterior wall of bayonet member 10. As illustrated in FIG. 1, inflatable seal 14 is axially positioned along bayonet member 10 so as to surround inflation port 22. Thus, pressurization gases or the like introduced through inflation tube 20 pass through port 22 for inflating the generally annular interior chamber 30 defined by inflatable seal member 14 in association with bayonet 10.

FIG. 1 illustrates seal member 14 in its inflated condition, wherein a bowing action is achieved so that a sealing function takes place with female member 12 in the vicinity of annular area 32 thereof. Seal member 14 preferably comprises a polymeric material, and more particularly comprises an FEP Teflon. Such a material provides desireable characteristics in that it is injection moldable and relatively impermeable to gaseous matter such as helium. Additionally, the resulting seal member 14 possesses semi-rigid characteristics which provides a durable seal member, while being sufficiently flexible to permit the bowing-action illustrated in FIG. 1, and immediate structural recovery thereof following release of the pressurant so that seal member 14 collapses away from annular area 32 of female member 12 (which releases the seal therebetween).

In addition to such polymeric inflatable seal 14, an inflatable seal assembly in accordance with one exemplary embodiment in accordance with the present invention comprises securement means about axial end portions of seal members 14. Particularly, seal member 14 includes tapered ends 34 and 36 which receive pairs of tightening rings thereabout. More particularly, each pair of rings include an inner ring 40 and an outer ring 42. Preferably, the inside diameter of inner rings 40 are received on relatively flat shoulder portions 44 of seal member 14 so that the broader-base inside diameter portions of outer rings 42 are wedged between the inclined planes formed by the tapered ends of the seal member and the inner rings 40, as the respective pairs of rings are screwed together.

In FIG. 1, the left hand pair of rings 40 and 42 are already completely engaged, preferably with Acme screw threads, which particularly provide adequate sealing force during tightening of the respective ring pairs, while allowing ample ring tolerance. Such tolerance is especially acceptable and advantageous since the rings are not part of the actual sealing element.

For purposes of illustration, the right hand pair of rings illustrated in FIG. 1 are not yet completely engaged. Thus, the angled inside diameter 50 of outer ring 42 is illustrated in opposition to the angled surface 52 of tapered end 36. Outer ring 42 is moved axially inward in the direction of arrow 54 as it is screwed into its respective inner ring 40. Thus, the angled surface 50 of outer ring 42 is wedged against the tapered surface 52 of seal member 14 so that the inside diameter surface 56 of such tapered end is tightly sealed against the outer wall 18 of male bayonet member 10. One preferred procedure for placement of seal 14 about male bayonet member 10 is outlined further below. Once secured in place and inflated as illustrated in FIG. 1, seal member 14 permits cryogenic materials or other types of fluids to be safely passed through male bayonet member 10 along the interior chamber 60 thereof into female member 12.

FIG. 2 illustrates an exploded perspective view of specific elements of an inflatable seal assembly in accordance with the present invention. In particular, an inflatable seal member 14 is illustrated having a main inflatable body portion 62 and respective tapered axial ends 34 and 36. Respective inner rings 40 each have outer annular areas 64 which receive smaller diameter inner annular areas 66 of outer rings 42. Such rings are preferably formed of stainless steel, such as seamless, CRES, 304 stainless steel, and are further provided with Acme threads as described above on opposing surfaces of areas 64 and 66 (but not illustrated in FIG. 2 for the sake of clarity). As understood from FIG. 1, the tightening ring assemblies are moved axially inward in the direction of arrows 68 towards the center of seal member 14 for receipt about the axial end portions thereof (as discussed above with reference to FIG. 1).

The placement of tightening rings about the male bayonet member is preferably accomplished with a spanner wrench 70 (FIG. 3), which includes an engagement projection 72 on the end of a curved arm 74 having a radius of curvature matching generally that of the tightening rings. By grasping the handle 76 of such spanner wrench and placing the engagement member 72 thereof in a suitable receiving hole (such as hole 80 in inner ring 40 of FIG. 1) the tightening ring so engaged may be rotated about the central axis of male bayonet member 10. Preferably, a plurality of such tightening holes are provided around the circumference of the tightening rings.

Figure 5A:
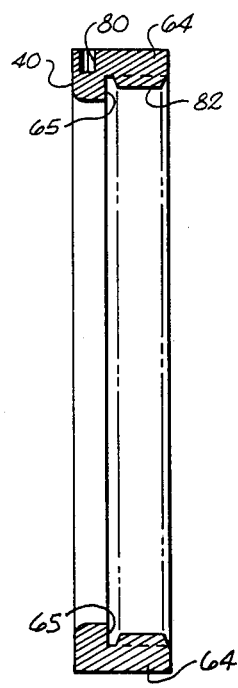
FIGS. 5A and 5B are an axial cross-sectional view and end view, respectively, of an inner ring of a tightening ring pair in accordance with the present invention.
Figure 5B:
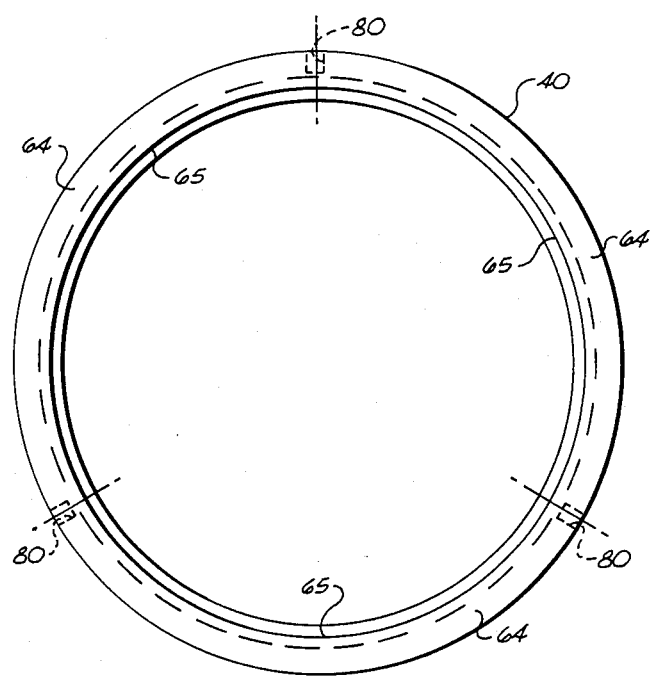

With reference to FIGS. 5A and 5B, a cross-section and end view, respectively, of an inner ring 40 is illustrated. Such ring includes three openings 80 defined about the periphery thereof and of adequate size for receipt of engagement end 72 of spanner wrench 70. With arm 74 appropriately applied to the outside diameter of the tightening ring, handle 76 of the spanner wrench projects generally perpendicular from the circumference of such tightening ring. Thus, maximum torque may be readily applied to the tightening rings for their proper positioning about seal member 14.

Figure 6A:
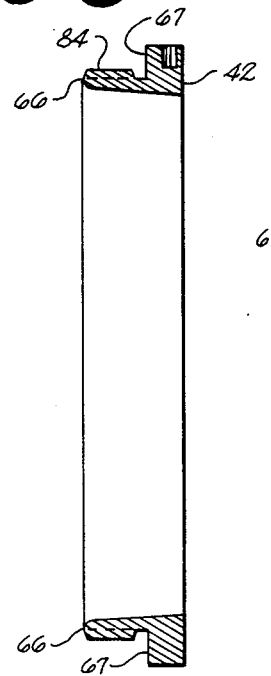
FIGS. 6A and 6B are an axial cross-sectional view and axial end view, respectively, of an outside ring of a tightening ring pair in accordance with the present invention.
Figure 6B:
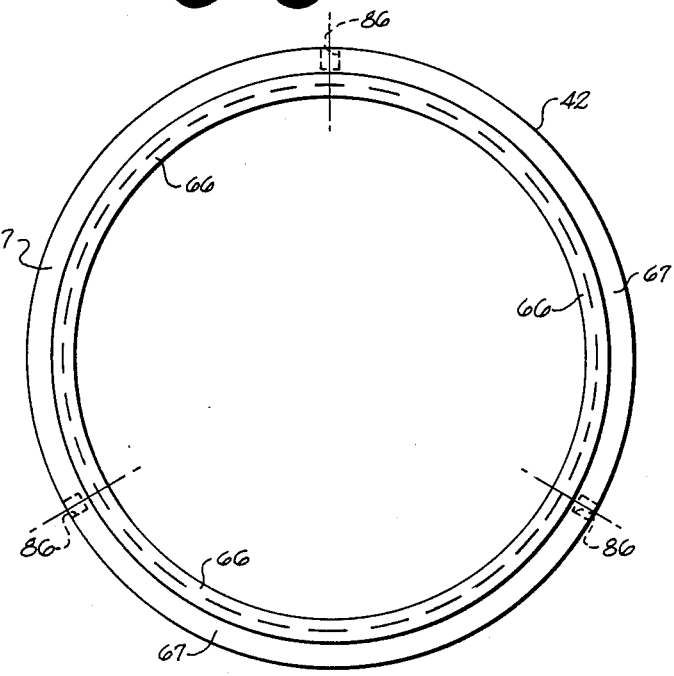

As discussed above, inner ring 40 includes an annular portion 64 which defines an interior annular area for receipt of a portion of outer rings 42 (see FIGS. 6A and 6B). The inside diameter of such annular area 64 is provided with Acme threads 82 which oppose and engage Acme threads 84 disposed on the outside diameter of annular area 66 of outer ring 42. Also, an annular surface 65 of ring 40 cooperates with an opposing annular surface 67 of ring 42 to provide a stop for progressing threadable engagement of a ring pair, and forms an axial seal between such rings when fully threadably engaged. Outside ring 42 also preferably includes a plurality of tightening holes or openings 86 about the periphery thereof, for selective engagement with a spanner wrench 70. As discussed above, the inside diameter of annular portion 66 of outside rings 42 are preferably on an angle for engaging the inclined wedges defined by the tapered ends of seal member 14. Thus, tightening of the Acme threads applies adequate pressure against the tapered ends of the polymeric seal member for slightly deforming same, which results in an effective seal between such inflatable seal member and the male bayonet member which it surrounds.

Figure 4:
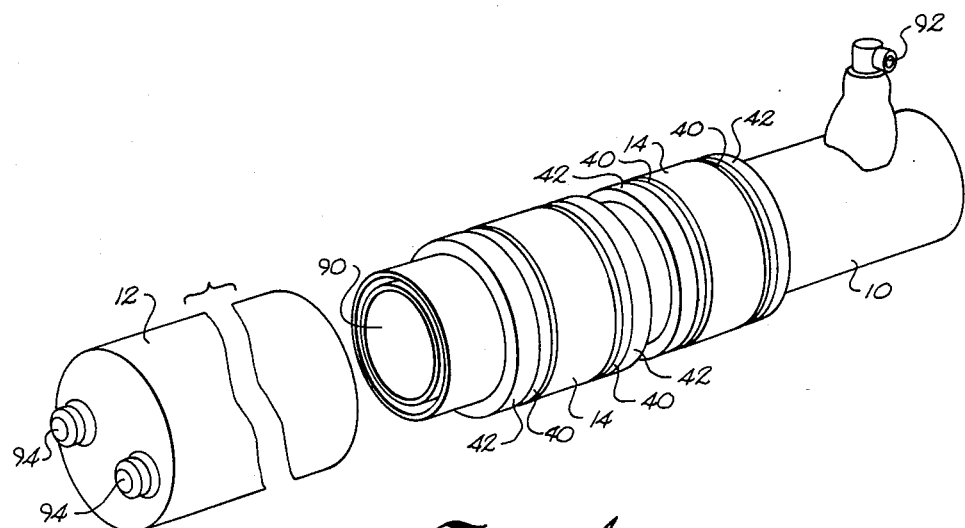
FIG. 4 illustrates a mateable pair of a female receiver and a male bayonet member, in accordance with the present invention, in coaxial alignment.

Referring now to FIG. 4, an inflatable seal assembly in accordance with the present invention may be mounted on male bayonet member 10 with the following procedure. As shown in FIG. 4, a pair of inflatable seal assemblies in accordance with the present invention may be provided axially displaced from one another about a single male bayonet 10, so that the redundancy thereof enhances the reliability of the resulting coupling operation with a female member 12. To mount such seal members, it is preferred that the inner tightening rings 40 thereof are first respectively positioned about the axial ends of a seal member 14. This requires that such inner tightening rings be squeezed onto the relatively flat, annular shoulders 44 of such axial ends (see FIG. 1). Next, the outer seal members 42 are loosely positioned about the tip end portions of the respective axial ends of inflatable seal member 14.

In such configuration, the seal assembly (including the seal member and its respective two sets of tightening rings) may now be readily slid onto the male bayonet member 10 and properly positioned with the interior chamber 30 of the inflatable seal member 14 positioned over an inflation port 22 defined in the outer side wall of male bayonet 10. Then, using spanner wrenches (such as illustrated in FIG. 3 and discussed above), inner rings 40 may be held stationary while their respective outer rings 42 are respectively screwed axially inward into engagement therewith. Thus, the tightening (or sealing off) of inflatable seal member 14 about male bayonet 10 is accomplished by the wedging action which occurs between the inclined bases of the tapered axial ends of seal member 14, the angular annular portion 66 of outer rings 42 and the capturing annular portions 64 of inner rings 40. Also, the stiff but deformable characteristics of the polymeric inflatable seal contribute to the advantages of the tightening wedge structure of the present invention.

Once outfitted as illustrated in FIG. 4, the open end 90 of a male bayonet member 10 is ready to be slid into a female member 12 so that cryogenic fluids introduced into fluid inlet 92 may be passed along the interior chamber 60 (FIG. 1) of bayonet member 10 and into and through the fluid exits 94 of female member 12. Such fluid exits obviously would be additionally coupled with an interior piping or storage system such as on a space station or the like.

Various fluids, particularly cryogenic materials, may be transferred with such apparatus. For example, liquid hydrogen, liquid nitrogen, liquid oxygen, or liquid argon may be so transferred. In each instance, the pressurizing gas introduced through inflation tube 20 (FIG. 1) must be selected in dependence on the type of cryogenic material being transferred. In general, such pressurizing gas needs to have a low enough boiling point so that it does not become liquified by the cryogenic material. The pressurization of an inflatable seal member 14 would be lost if such liquefaction occurred. Preferably, either gaseous helium or gaseous nitrogen may be used as the pressurant. Nitrogen in general is cheaper than helium, but helium has a lower boiling point, and thus must be used with certain cryogens such as liquid hydrogen or liquid nitrogen. Also, the same gaseous pressurant should not be used with the liquid cryogen. For example, gaseous nitrogen should not be used for pressurizing inflatable seal member 14 whenever liquid nitrogen is to be introduced into fluid inlet 92.

While specific features of a construction in accordance with the present invention have been set forth in an exemplary embodiment thereof, the spirit and scope of this invention should not be strictly limited to such examples. For example, the dimensions of various apparatuses in accordance with the present invention may be adapted for use in particular applications. For example, the diameter of the male bayonet member may in general vary between 2 and 4 inches, with the resulting size of the inflatable seal member and tightening rings for use therewith varying accordingly. The pressurization line is preferably at least about a ⅛ inch stainless steel tube, but maybe larger such as ¼ inch whenever a 4 inch quick-disconnect male bayonet member is used. Also, the size and nature of the fluid inlet to the male bayonet member may vary, with an approximately two inch screw-on type line being typical.

Various modifications to the present invention may be practiced by those of ordinary skill in the art, all of which modifications are intended to come within the spirit and scope of the present invention. Furthermore, the present exemplary embodiment and the description thereof is intended for purposes of disclosure only, and not for purposes of limiting the present invention, which limitations are set forth only in the appended claims.

What is claimed is:

1. A seal assembly, comprising:
   a first tube having an opening in at least one axial end thereof, and defining an interior channel axial therein and intersecting with said opening, said first tube adapted for being received within a second tube of larger diameter;
   an inflatable seal member received about said first tube and having a central body with tapered ends on each axial end thereof, each such end forming an inclined plane relative said first tube; and
   securement means, received about said tapered ends, for securing said seal member to said first tube, said securement means including respective pairs of mutually threadable tightening rings situated about said tapered ends such that threaded tightening of the respective pairs of rings causes at least one ring of each such pair to be axially advanced against the inclined plane of its corresponding tapered end for securing said inflatable seal member to said first tube by compressing and sealing such tapered end between such one ring and said first tube; wherein
   said inflatable seal member may be controllably inflated when said first tube is received within a second tube so that said seal member is pressed into contact with the inside surface of the second tube, whereby said first tube is sealed with respect to the second tube so as to permit fluid to be passed to the second tube through said channel and said opening of said first tube.

2. A seal assembly as in claim 1, wherein said seal member further includes annular shoulder portions adjacent to and axially inward from said tapered ends thereof.

3. A seal assembly as in claim 2, wherein:
   said inflatable seal member comprises a semi-rigid polymeric material which is relatively impermeable to gasses introduced thereto.

4. A seal assembly as in claim 3, wherein
   said seal member is comprised of an injection-moldable FEP polymeric resin, which results in a relatively stiff but deformable seal member;
   said tightening rings are comprised of seamless stainless steel and have Acme threads for applying adequate force to said seal member during tightening of said rings for sealing said seal member about said first tube;
   said fluid comprises cryogenic material such as one of liquid hydrogen, liquid oxygen, liquid nitrogen, and liquid argon; and
   gas for pressurizing said inflatable seal member comprises one of gaseous helium and gaseous nitrogen, selected in accordance with the particular cryogenic material used.

5. A seal assembly as in claim 3, wherein said tightening rings define wrench-interface openings around the periphery thereof adapted for receipt of a spanner wrench for rotatably driving said rings selectively in and out of threaded engagement with one another.

6. A seal assembly as in claim 1, wherein:
   said first tube comprises a male bayonet member having a double wall construction, with an inflation tube disposed between the double walls thereof, and defines an inflation port in a side wall thereof connected to said inflation tube; and further wherein
   said inflatable seal member is received about said first tube in an axial position which overlays said inflation port thereof, so that said seal member may be inflated by gas introduced into said inflation tube.

7. A seal assembly as in claim 1, wherein:
   said inflatable seal member includes a relatively flat end portion thereof between said central body thereof and said tapered ends.

8. A seal assembly as in claim 1, further comprising a second inflatable seal member received about said first tube and axially displaced from the first-mentioned inflatable seal member, said second inflatable seal member including additional securement means thereabout for securing same to said first tube, whereby the reliability of said seal assembly is thereby increased.

9. A seal assembly, comprising:
   a first tube having an opening in at least one axial end thereof, and defining an interior channel axial therein and intersecting with said opening, said first tube adapted for being received within a second tube of larger diameter;
   an inflatable seal member received about said first tube and having tapered ends; and
   securement means, received about said tapered ends, for securing said seal member to said first tube; wherein
   said inflatable seal member may be controllably inflated when said first tube is received within a second tube so that said seal member is pressed into contact with the inside surface of the second tube, whereby said first tube is sealed with respect to the second tube so as to permit fluid to be passed to the second tube through said channel and said opening of said first tube;
   said first tube comprises a male bayonet member having a double wall construction, with an inflation tube disposed between the double walls thereof, and defines an inflation port in a side wall thereof connected to said inflation tube;
   said inflatable seal member is received about said first tube in an axial position which overlaps said inflation port thereof, so that said seal member may be inflated by gas introduced into said inflation tube; and further wherein said first tube has a diameter in the range of from about 2 to about 4 inches, and said inflation tube received within the double wall construction of said first tube has a diameter of from about ⅛ to ¼ of an inch, said double walls being radially separated from one another adequate to accept said inflation tube therebetween.

10. A quick-disconnect inflatable seal assembly, for leak-proof transfer of fluids, comprising:

an inner tube having a passage therein adapted for the passage of fluids therethrough;

an inflatable seal member, received about said inner tube, and having tapered edges on each axial end thereof;

clamping rings received about said tapered edges adequate to secure said seal member about said inner tube; and an outer tube, having an inside diameter larger than the outside diameter of said inner tube with said seal member and said clamping rings disposed thereabout; wherein with said inner tube received within said outer tube, said seal member may be inflated to project radially outward an amount adequate to sealingly contact said outer tube inside diameter, so as to permit the leak-proof transfer of fluids between said tubes; and said inner tube comprises a male bayonet member having a double wall construction for the insulated passage of cryogenic fluids therethrough, and further includes a pressurization line disposed within such double wall construction, said line terminating at one end thereof in an inflation port defined in the outer surface of said inner tube so that gas introduced into said pressurization line enters said inflatable seal member through said inflation port for controllably inflating said seal member.

11. An inflatable seal assembly as in claim 10, wherein said inflatable seal member comprises semi-rigid polymeric material, and projects during its inflation radially outward beyond the outside diameter of said inner tube with said clamping rings secured thereabout so as to engage the inside diameter of said outer tube, and immediately recovers from such outwardly projected position upon release of pressurization to said seal member, said seal member at all times being relatively impermeable to gaseous materials admitted thereto for inflating same.

12. An inflatable seal assembly as in claim 10, wherein said clamping rings comprise respective pairs of threadably engageable inner and outer tightening rings, with said inner ring being received on a relatively flat circumferential area of said seal member, and projecting therefrom with an overhung portion for defining an annular space about said seal member, and with said outer tightening rings comprising rings for threadably engaging said inner tightening rings while received within said annular space defined thereby, said outer tightening rings further defining tapered inside diameters for engaging the tapered edges of said inflatable seal member, wherein said outer tightening rings are drawn towards said inner tightening rings with increased threadable engagement therebetween so as to be wedged into said annular space between said overhung portion and said tapered edges.

13. An inflatable seal assembly as in claim 10, wherein:

said seal member comprises polymeric material, and said clamping rings comprise pairs of threadably matable stainless steel rings which tighten around said seal member adequate to slightly deform said tapered edges thereof, whereby outer of said rings are drawn further onto said tapered edges as same are rotatably engaged with inner rings of said pairs, so as to seal said inflatable seal member about said inner tube adequate to receive and retain gas therein.

14. A beyonet-type quick-disconnect cryogenic coupling for the zero-leakage transfer of cryogenic fluids, comprising:

a male bayonet member adapted for receipt in a female receptable member, and for the passage of cryogenic fluid therethrough into said female member;

at least one inflatable seal received about the circumference of said bayonet member in a fixed axial portion thereof, said seal member having axial ends including tapered portions inclined away from the body of said seal member;

a pair of interacting tightening rings disposed about each axial end of said seal for securing same to said bayonet member;

a female member adapted for receipt for said bayonet member therein with said seal and said pairs of rings disposed about said bayonet member; and means for selectively inflating said seal with a gas, while said bayonet member is received in said female member, adequate to sealingly engage the interior of said female member, whereby cryogenic fluids may be passed from said bayonet member to said female member without leakage therebetween; wherein said seal includes annular shoulder portions at the top of the inclines of said tapered portions; and axially inward rings of said ring pairs reside about said seal shoulder portions so that their respective axially outward rings are drawn inward against said inclines as the respective ring pairs are threadably engaged.

15. A cryogenic coupling as in claim 14, wherein:

said male bayonet member includes a double wall construction tube; and said means for selectively inflating said seal includes a pressurization line received within said double wall construction of said bayonet member, and an inflation port defined therebetween and the outside diameter of said male bayonet member; and further wherein said inflatable seal is received about said bayonet member positioned over said inflation port so that gas introduced through said pressurization line to said inflatable seal via said inflation port selectively inflates such seal.

16. A cryogenic coupling as in claim 15, further comprising:

an additional inflatable seal axially displaced along said male bayonet member from said at least one inflatable seal thereof; and a separate pressurization line and inflation port operatively associated with said additional inflatable seal, whereby the reliability of said cryogenic coupling is increased.

17. A cryogenic coupling as in claim 14, wherein:

said inflatable seal comprises polymeric material;

said tightening rings comprise stainless steel material; and said male bayonet member includes a sealable inlet port for the introduction of cryogenic fluids into the interior thereof, which fluids are transferred to said female member during operation of said cryogenic coupling.

* * * * *